United States Patent [19]
Habisohn

[11] 3,798,519
[45] Mar. 19, 1974

[54] PLURAL MOTOR CONTROL SYSTEM

[75] Inventor: Victor J. Habisohn, Hoffman Estates, Ill.

[73] Assignee: Power Electronics International Inc., Chicago, Ill.

[22] Filed: Feb. 7, 1973

[21] Appl. No.: 330,421

Related U.S. Application Data

[63] Continuation-in-part of Ser. Nos. 29,869, April 20, 1970, and Ser. No. 284,342, Aug. 28, 1972.

[52] U.S. Cl.............. 318/46, 318/45, 318/227, 187/29
[51] Int. Cl. .............................................. H02p 1/54
[58] Field of Search ............ 318/40, 45, 46, 61, 62, 318/230, 227; 187/29

[56] References Cited
UNITED STATES PATENTS

| | | | |
|---|---|---|---|
| 2,982,897 | 5/1961 | De Hertel Eastcott | 318/46 |
| 2,726,360 | 12/1955 | Storsand | 318/46 |
| 2,046,721 | 7/1936 | Bouton et al. | 318/46 |
| 1,628,409 | 5/1927 | Kelsey | 318/46 |
| 3,678,355 | 7/1972 | Bucek et al. | 318/227 X |

*Primary Examiner*—T. E. Lynch
*Attorney, Agent, or Firm*—Jerome Goldberg

[57] ABSTRACT

A motor control system including a three phase AC motor means for driving a load at high speed and a single phase AC motor means for driving the load at a lower speed. The electrical energy transferred to the three phase motor means may be progressively increased until the three phase motor means operates at said high speed; and the electrical energy transferred to the single phase motor means may be progressively increased until the single phase motor means operates at said lower speed. In an elevator application of the subject motor control system, the elevator movement from one vertical level to a second level is started with the three phase motor means, and the elevator speed is progressively increased until reaching a maximum speed as the 3 phase motor reaches the high "full" speed. Prior to levelling the elevator at the second level, the control system is switched from the three phase motor to the single phase motor, to provide a counter torque for decelerating the speed of the elevator until the elevator is slowed to a minimum speed as the single phase motor means reaches the low "full" speed.

37 Claims, 4 Drawing Figures

PATENTED MAR 19 1974                                             3,798,519

PLURAL MOTOR CONTROL SYSTEM

REFERENCE TO OTHER APPLICATIONS

This patent application is a continuation-in-part of the co-pending patent applications:
Ser. No. 29,869, entitled "A Slow Start-Stop Motor Control System," filing date Apr. 20, 1970, and Ser. No. 284,342 entitled "Multiple Speed Motor Control System," filing date Aug. 28, 1972, and includes subject matter common with said earlier applications.

BACKGROUND OF THE INVENTION

This invention relates generally to a two speed motor control system, and more particularly relates to a motor control system including a three phase motor and a single phase motor. Still more particularly the invention relates to a two speed elevator motor control system using a three phase motor for the high spped and a single phase motor for the low speed.

When moving an elevator from one level to a second level, it is desired to quickly and smoothly accelerate the elevator speed from the starting point until the elevator reaches a high maximum speed; and, as the elevator approaches the second level, to smoothly decelerate to a low levelling speed prior to applying the brake for stopping the elevator at the second level.

In buildings having up to 6 floors, hydraulic or alternating current (AC) elevators are generally used. From about 6 to 25 floors the direct current (DC) or Ac type elevators are used. For the high rise buildings, particularly those exceeding 25 floors, a DC elevator system is almost exlusively used. The DC system has a wide speed span between the high speed and the low levelling speed, and includes variable speed control for acceleration and deceleration between the extreme speeds. A DC elevator system, however, is far more expensive than the AC elevator system. This is primarily due to the DC system providing wide range speed control and also requiring an AC motor driving a DC generator and a DC motor.

The AC elevator systems generally used heretofore did not provide the smooth acceleration and deceleration comparable to the DC system. Furthermore, prior AC systems did not have the capability to sufficiently slow down prior to levelling and braking to a stop.

The AC elevator system is usually either single speed or two speed. In single speed AC elevator operation, the elevator is accelerated until reaching "full" speed and then decelerated prior to levelling. The selected single speed cannot be too high since it may impede or prevent proper levelling at the stopping point.

In the two speed AC elevator operation usually a three phase motor having a high speed stator winding and a low speed stator winding is used. The elevator is started in the high speed mode and increases in speed until the motor reaches the "high" full speed, and as the elevator approaches the stopping point it switches into the low speed mode; and then decreases in speed until the motor reaches the low "full" speed, and is then braked for levelling at the stopping point. Thus, the two speed AC system enables the elevator to greatly increase in accelerating speed as compared to the single speed AC system.

The two speed AC elevator systems used prior to the subject invention, were unable to economically operate at a high accelerating speed and a sufficiently low enough levelling speed to provide smooth "jerk free" stopping of the elevator. In order to provide a levelling low speed in the range of for example, 300 to 120 revolutions per minute, the low speed stator of the motor required from 24 to 60 poles per phase, or a three phase stator having a total number of from 72 to 180 poles. With such a large number of poles required to achieve 120 rpm, the cost of such an AC system would or near exceed the cost of a DC system. Thus, the low speed for a two speed elevator system was rarely below 300 rpm.

The subject invention overcomes the low levelling speed problem, by providing a two speed elevator motor system having a three phase motor to generate the high speed and a single phase motor to generate the low speed. Thus, by utilizing the single phase motor for decelerating the system, only from 24 to 60 poles total are required to generate a low speed between 300 to 120 rpm, instead of from 72 to 180 poles needed for the equivalent speed using a three phase motor. Hence, an AC system is disclosed herein having the capability to provide a speed range comparable to DC elevator systems used in buildings having 5 to 25 floors.

Accordingly, a primary object of the subject invention is to provide a two speed alternating current (AC) motor control system having a wide speed variation between the high speed and the low speed.

Another object is to provide an AC motor control system having a three phase high speed motor means and a single phase low speed motor means.

Another object is to provide a two speed elevator system having a high speed generated by a three phase motor means and a low speed generated by a single phase motor means.

Another object is to provide an AC elevator system that progressively increases in speed until reaching a maximum speed, and to progressively increase the counter torque to decelerate the elevator until reaching a minimum speed.

Another object is to provide a two speed AC elevator system having a comparable speed range as a DC system, and provides substantially the same smoothness when accelerating and decelerating as the DC system.

Another object is to provide an AC motor control system including a three phase motor means for accelerating a load to reach a maximum speed and a single phase motor means for decelerating a load to a minimum speed.

BRIEF DESCRIPTION OF THE DRAWINGS

Referring to the drawings in which the same characters of reference are employed to indicate corresponding or similar parts throughout the several figures of the drawings.

DESCRIPTION OF THE PREFERRED EMBODIMENT

Figure 1:
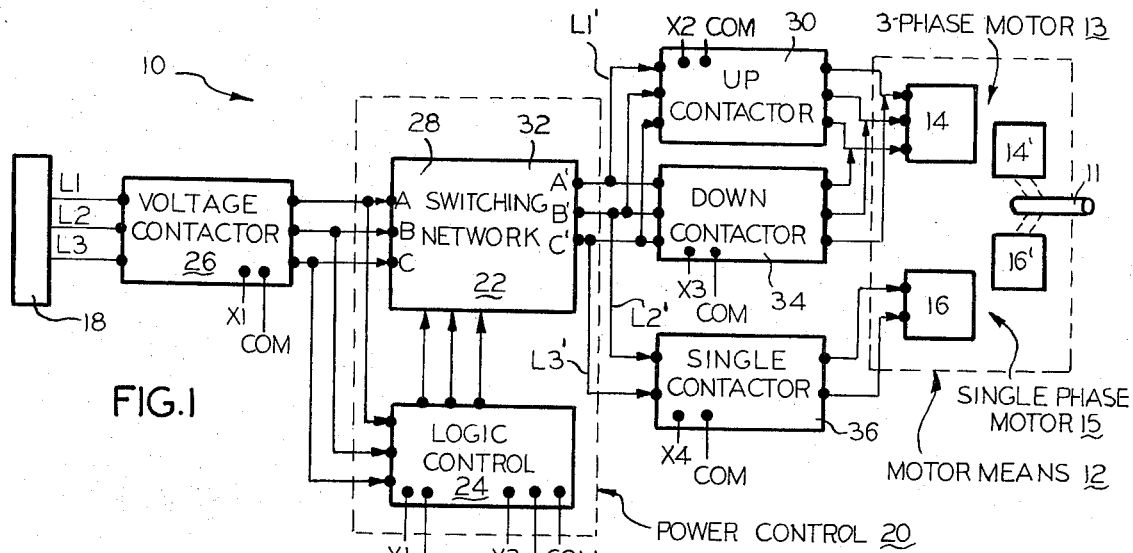
FIG. 1 is a block diagram of a power control system for controlling a three phase induction motor and a single phase induction motor, embodying the principals of the invention.
Figure 2:
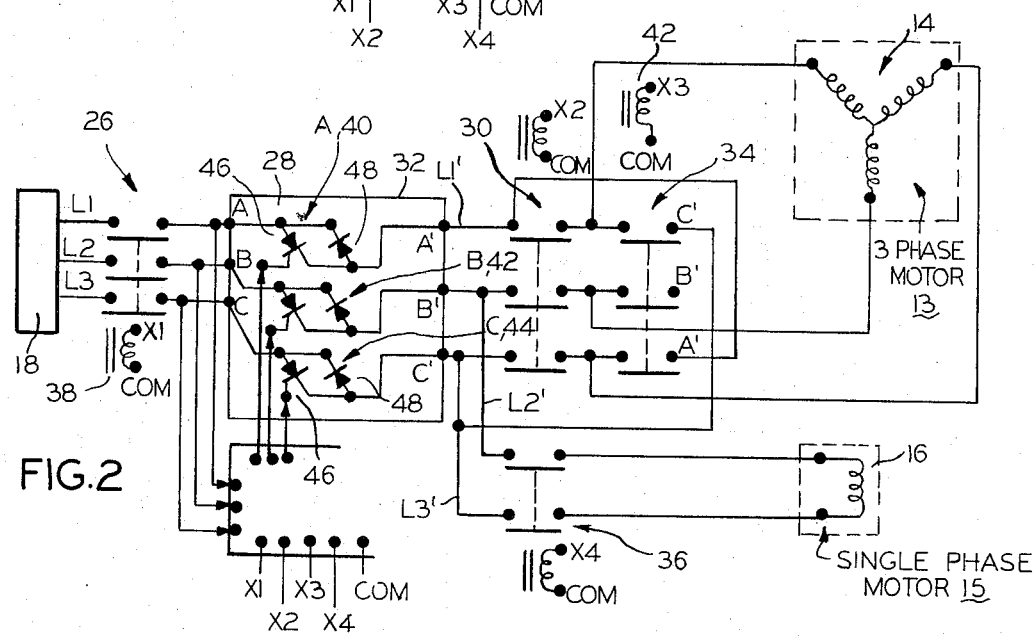
FIG. 2 is a schematic of the static switching network and the line mechanical switches for connecting the electrical source and the three phase and the single phase motors to the switching network.

Referring now particularly to FIGS. 1 and 2 of the drawings, the reference numeral 10 indicates generally a motor control system for driving a load 11, such as an elevator moving in a vertical direction between two points or levels. The system 10 includes a motor means 12 having a high speed mode and a low speed mode. Motor means 12 comprises a three phase motor 13 having a three phase stator 14 driving a three phase rotor 14' to provide the high speed mode; and a single phase motor 15 having a single phase stator 16 driving a single phase rotor 16' to provide the low speed mode. Suitable coupling means (not shown) is used to connect the motor rotors 14' and 16' with the load 11. Alternatively, the motor means 12 may be designed, so that the three phase stator 14 and the single phase stator drive a common rotor (not shown). Thus, when the 3 phase motor 13 is operating at "full" high speed, the load is being driven at maximum speed; and when the single phase motor 15 is operating at "full" low speed, the load is being driven at minimum speed.

Input alternating current (AC) 3 phase power lines L1, L2, and L3 are connected from a power source 18 to the system 10. The proper phase relationship between lines L1, L2 and L3 are required to provide controlled and repeatable operation of system 10.

A power control means indicated generally by the reference numeral 20 transfers electrical power to the three phase stator winding 14 and to the single phase stator winding 16. The power control means 20 includes a static switching network 22 and an operational logic control means 24 to selectively control the electrical energy transferred by the static switching network 22 to the 3 phase stator 14 and to the single phase stator 16.

The operational control means 24 progressively increases the period of current conduction through the switching network 22 per AC current cycle from an initial time period per cycle to a greater time period per cycle until reaching a maximum period of current conduction per cycle. The period for voltage transfer is similarly progressively increased, but for an inductive load there is a phase shift between the corresponding current and voltage periods. Thus, the torque developed by the three phase motor 13 or the counter torque provided by the single phase motor 15 is progressively increased. In deceleration, it may be desirable to maintain the initial period of energy transfer for a predetermined time interval, and thereafter progressively increase energy transfer.

In operation, the cooperation of the operational control means 24, with the switching network 22, causes the speed of the 3 phase motor 13 and the driven elevator load 11 to accelerate, as the period per AC cycle of electrical energy transferred to the 3 phase motor means 13 is progressively increased; and such cooperation causes the elevator load 11 to decelerate after switching to the single phase motor 15, due to the progressive increase in counter torque provided by the single phase motor 15, as the period per AC cycle of electrical energy transferred to the single phase motor 15 is progressively increased.

A 3 phase voltage contactor means 26 connects and disconnects 3 phase voltages from lines L1, L2 and L3 to the input 28 of the static switching network 22 (FIG. 2). For purposes of the description herein, the voltage contactor 26 connects the voltage in a forward phase direction to points A, B and C.

An up-three phase stator contactor switch means 30 connects the output points A', B' and C' from the output 32 of the static switching network 22 to the three phase stator 14 (FIG. 2) to provide forward rotation of the three phase rotor 14'.

A down-three phase stator contactor switch means 34 connects the output points A', B' and C' from the output 32 of the static switching network 22 to the three phase stator 14, in the reverse voltage direction with respect to the connections made by the up-contactor 30, to provide reverse rotation of the three phase rotor 14'. For convenience of illustration contactors 30 and 34 are referred to as up or down contactors, but for horizontal movement such contactors may be referred to as forward and reverse contactors.

A single phase stator contactor switch means 36 connects output lines L2' and L3' from the output 32 of the static switching network 22 to the single phase stator 16.

The voltage contactor 26, the up and down contactors 30 and 34 and the single phase contactor 36, each have an open-position and a closed-position. When the voltage contactor 26 is initially switched into the closed-position, either the upcontactor 30 or the down contactor 34 is simultaneously switched into the closed-position. This switches system 10 in the high speed mode and the elevator load 11 begins to accelerate in speed as the torque generated by the three phase rotor 14 is progressively increased.

After the elevator 11 is moving or is being accelerated by the 3 phase motor 13, the system 10 may be switched into the low speed mode by switching the up or down contactor 30 or 34, whichever is in the closed-position, into the open-position; and thereafter switching the single phase stator contactor 36 into the closed-position, to connect the single phase motor 15 to the output 32 of the switching network 22. The elevator load 11 then begins to decelerate in speed as the counter torque generated by the single phase motor 15 is progressively increased, until the single phase motor 15 is operating at or near the low "full" speed and the load is moving at the minimum speed.

The cooperation of the operational control means 24 with the voltage contactor 26, the up and down contactors 30 and 34 and the single phase contactor 36 initially generate a disable signal for a time delay period to prevent current conduction through the static switching network 22 until these contactors physically connect or "make" in the system; and also such cooperation generates a disable signal to prevent current conduction through the system 10 just prior to such contactors 26, 30, 34 or 36 disconnecting or "breaking" from the system. The disable signal(s) is generated in response to the energizing or de-energizing of the contactor coils 38, 40, 42 and 44. Points X1, X2, X3 and X4 of these coils as shown in FIG. 1 and 2 are connected to the operational control means 24.

To move the elevator load 11 in the up direction, the electrical voltage is connected to the three phase motor 13, for example, in a forward phase direction via the up-contactor 30; and to move the elevator load in the down direction, the electrical voltage is connected to the three phase motor 13 in a reverse phase direction via the down-contactor 34. The voltage connected to the single phase motor 15 is always connected in the same phase via the single phase contactor 36.

The rotational direction of the single phase motor 15 follows the rotational direction of the 3 phase motor 13. Thus, if the system 10 is switched to the single phase motor 15 when the 3 phase motor 13 is rotating in a forward or clockwise direction, the single phase motor 15 follows and will also rotate in the forward direction. Conversely, if the system 10 is switched to the single phase motor 15 when the three phase motor 13 is rotating in a reverse or counter-clockwise direction, the single phase motor 15 follows and will also rotate in the reverse direction, Thus, the single phase motor 15 does not require a starting coil.

The following describes the operation of system 10 as an elevator load 11 is moved from one level to an upper level. Upon starting the elevator, the voltage contactor 26 and the up-contactor 30 are activated to switch from their open-position to their closed-position. Contactor 26 connects the voltage lines L1, L2 and L3 to points A, B and C at the input 18 to the switching network 22. The up-contactor 30 connects points A', B' and C' at the output 32 of network 22 in the forward direction with the stator 14 of the 3 phase motor 13. Now the system 10 is switched into its high speed mode.

Prior to the transfer of power from the input 28 to the output 32 of the static switching network 22 a disable signal(s) is generated for a delay period to enable the contactors 26 and 30 to make positive contact. At the end of such delay period, the switching network 22 is ready to transfer energy.

The period of electrical energy transfer per AC voltage and current cycle progressively increases through network 22 from an initial time period for the first cycle to a greater time period during successive cycles, until the speed of the three phase rotor 14' rotates at or near full speed, and the elevator travels upward at or near maximum speed.

When the elevator 11 is near the upper level point which is usually after full speed is reached, system 10 is switched into the low speed mode. When this occurs, a disable signal is generated to stop current conduction through the static switching network 22 prior to the disconnecting of the three phase up-contactor 30 from the system 10. Hence, when the up-stator contactor 30 finally breaks from its connections with the output 32 of the switching network 22, no current is flowing through network 22.

The single phase-stator contactor 36 then switches into the closed condition to connect the output lines L2' and L3' from points B' and C' at output 32 of the network 24 with the single phase stator 16 of the single phase motor 15. Prior to transferring electrical power to the single phase stator 16, there is another or second time delay. The delay due to the up-contactor 30 "breaking" and the contactor 36 "making" contact, may overlap.

After the second delay period, the period of electrical energy transferred per AC cycle through the static switching network 22 to the single phase motor means 15, is progressively increased, to cause the elevator load 11 to slow down from the maximum speed toward the minimum speed. Thus, the speed of the load 11 progressively decreases, until finally the elevator is operating at or near the minimum speed determined by the full low speed of the single phase motor 15. After the single phase motor 15 reaches the "full" low speed or a speed near such "full" low speed, the elevator is ready for levelling and stopping at the upper level.

The system 10 operates in the same manner when moving from an upper level to a lower level. Upon starting in the down direction, the 3 phase voltage contactor 26 connects 3 phase voltage to the input 28 of the switching network 22, and the 3 phase down contactor 34 connects points A', B' and C' at the output 32 of the switching network 22 with the stator 14 of the 3 phase motor 13 in the reverse direction (FIG. 2).

After a delay interval, to enable the voltage contactor 26 and the down contactor 34 to make positive contact, the period of electrical current conduction is progressively increased through the switching network 22; and the speed of the elevator 11 increases responsively as the 3 phase motor means 12 accelerates in speed. When the three phase motor means 12 reaches full "high" speed, elevator 11 descends downward at a maximum speed. When the elevator 11 is near the lower level ready for levelling, the system 10 switches from the 3 phase high speed mode of operation to the single phase low speed mode of operation. Electrical energy transfer is delayed until after the down-contactor 34 "breaks" contact and the single phase contactor 36 "makes" contact; and thereafter, the period of electrical energy transfer from the switching network 22 to the single phase motor 15 progressively increases, which causes a build up of the counter torque acting on the elevator 11. The speed of the elevator progressively decreases until the minimum speed is reached near the lower level, which is determined by the "full" low speed of the single phase motor "breaks" contact and the single phase contactor 36 "makes" contact; and thereafter, the period of electrical energy transfer from the switching network 22 to the single phase motor 15 progressively increases, which causes a build up of the counter torque acting on the elevator 11. The speed of the elevator progressively decreases until the minimum speed is reached near the lower level, which is determined by the "full" low speed of the single phase motor 15. The elevator 11 is now ready for levelling and stopping at the lower level by utilizing suitable braking means.

Prior to reaching the lower level, however, the transfer of electrical energy to the single phase motor 15 may be stopped and the single phase contactor 36 switched from the closed to the open-position. The up-contactor 30 is then switched to the closed-position, and the period of electrical energy thereafter, is progressively increased to the three phase motor means to generate a counter torque for slowing down the elevator toward zero speed, to provide self levelling.

Similarly, if the elevator overshot the lower level, the period of electrical energy transfer per AC cycle could be progressively increased in the reverse direction to provide a counter-torque for returning the elevator slowly to the lower level stopping point.

The aforestated technique for levelling or stopping the elevator by reversing the direction of the electrical energy transferred to the motor means may also be used for a single speed elevator system. In such single speed systems, the electrical energy is transferred in one direction for accelerating the elevator, and in the opposite direction for decelerating the elevator or levelling the elevator in the event of an overshoot. In the acceleration, deceleration or levelling mode, the period of electrical energy transferred to the single speed motor means would be progressively increased to provide smooth speed variations.

The switching network 22, as may be seen in FIG. 2, comprises three static switches A,40, B,42 and C,43. The sequence for switching the switches from an off-condition to a conduction-condition determines the phase of the power appearing at output terminals A' B' and C' of the switching network 22 and thus determines the rotational direction of the three phase motor means 13 and the single phase motor means 15. Although various types of static switches are suitable, a thyristor and diode combination connected in parallel is used in the illustrative embodiment. Current flow is controlled by the firing of the thyristors, and the current return is provided by the diodes. For greater output power requirements, a pair of thyristors may be more suitable than the single thyristor and diode. A thyristor is also commonly referred to as a silicon controlled rectifier (SCR).

Static switched A,40, B,42 and C,43 each includes a thyristor 46 and a diode 48 connected in parallel, the anode and cathode of the diode being connected respectively to the cathode and anode of the thyristor.

Upon switching the voltage switch 26 to the closed-position, the voltage is connected to points A, B and C; from the source 18 and upon firing of the static switches 40, 42 and 44, electrical connections are made with points A', B' and C'. Points A', B' and C' are connected to the three phase stator 14 via the up and down contactors 30 and 34, and points B' and C' are connected to the single phase stator 16 via the single phase contactor switch 36. The three phase power transferred through the static switches A,40, B,42 and C,44 provide a half wave motor control system.

The illustrative embodiment shows the three static switches providing electrical energy for both the 3 phase and single phase motors. However, it is within the comtemplation of the subject invention that a static switching network 22 may be used for the 3 phase motor 13 and a separate static switching network used for the single phase motor 15.

The operational control means includes means for generating a voltage decaying signal and means for generating a reference signal for each phase of the three phase input voltage. Th e cooperation of the voltage decaying signal means and the reference signal means determines the point in the AC cycle for firing the SCR's "on" and consequently determine the period per cycle during which electrical energy is transferred from the source to the motor means. The SCR's are automatically turned "off" after the voltage across the anode and cathode reverse phase.

Figure 3:
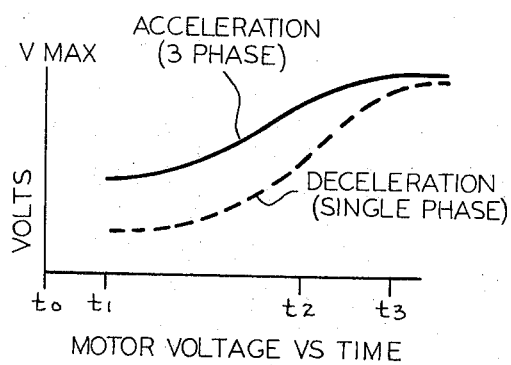
FIG. 3 is a curve of voltage versus time of the power control system when accelerating due to the three phase motor and voltage versus time of the power control system when decelerating due to the single phase motor.

FIG. 3 illustrates the acceleration mode of system 10, as the voltage ttansferred through the switching network 22 to the three phase motor 13 is progressively increased from a minimum voltage to a maximum voltage between a time $t1$ and $t3$. The system 10 is switched into the acceleration mode at time $t0$. Between time $t0$ and $t1$, there is a delay period prior to electrical energy transfer to the three phase motor 13, and such energy transfer begins at time $t1$.

Deceleration of system 10 is illustrated by the broken line in FIG. 3 and occurs between time $t1$ and $t3$, as the voltage transferred through the switching network 22 to the single phase motor 15 is progressively increased from a minimum voltage to a maximum voltage. The system 10 is switched into the deceleration mode by disconnecting the three phase motor 13 and connecting the single phase motor 15 at a time $t0$. Between time $t0$ and time $t1$, there is a delay period prior to electrical energy transfer to the single phase motor 15, and such energy transfer begins at time $t1$.

Figure 4:
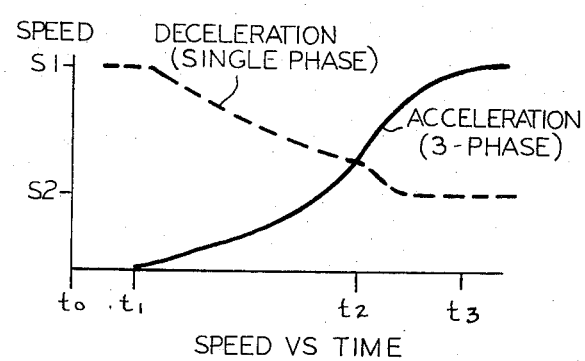
FIG. 4 is a curve of speed versus time of the system illustrating the acceleration in speed until reaching a maximum speed S1, and the deceleration in speed until reaching the minimum speed S2.

FIG. 4 illustrates the acceleration of system 10 as the speed of the load caused by the three phase motor 13, is progressively increased from zero speed until reaching maximum speed $s1$, between a time $t1$ and time $t3$. Deceleration is shown as the speed of the load is progressively decelerated by the single phase motor 15, from the $s1$ speed until decreasing to the low speed $s2$ (full speed of the single phase motor 15).

The foregoing specification and description are intended as illustrative of the invention, the scope of which is defined in the following claims.

I claim:

1. A motor control system for moving a load comprising:

a three phase alternating current (AC) motor means for increasing the speed of movement of said load;

a single phase AC motor means for decreasing said speed of movement;

a power switching network having an input and an output for transferring electrical energy from said input to said output; and means for associating said three phase and said single phase motor means with said output of the switching network.

2. The system of claim 1, wherein said last-mentioned means includes:

motor switch means for connecting and disconnecting said three phase and single phase motor means from said switching network.

3. The system of claim 1, wherein said power switching network includes:

a three phase power switching means for transferring three phase electrical power to said three phase motor means; and a single phase power switching means for transferring single phase electrical power to the single phase motor means.

4. The system of claim 1, includes:

voltage switch means for connecting and disconnecting electrical voltage from the input of said switching network.

5. The system of claim 1 includes:

means to associate said three phase motor means with said power switching network for increasing the speed of said load; and means for dis-associating said three phase motor means from said power switching network and associating said single phase motor means for providing a counter torque to act on said load to decrease the speed of the load.

6. The system of claim 1 includes:

an operational control means to progressively increase the period of current conduction through said power switching network from an intital time period to a greater time period per cycle, when transferring said energy to said three phase motor means or said single phase motor means.

7. The system of claim 2 includes:
means for preventing current conduction through said power switching means when connecting either of said motor means to the output of said power switching network.

8. The system of claim 7 includes:
delay means to prevent current conduction for a predetermined time period after switching either of said motor means to said power switching network.

9. The system of claim 2, wherein said motor switch means:
a three phase motor switch means for connecting and disconnecting three phase electrical energy from the output of the switching network to the three phase motor means; and
a single phase switch means for connecting and disconnecting single phase electrical energy from the output of the switching network to the single phase motor means.

10. The system of claim 4, wherein said voltage switch means includes:
means to generate a disable signal to prevent current conduction through said power switching network when connecting and disconnecting voltage from the input of said switching network.

11. The system of claim 10 includes:
delay means to prevent current conduction for a predetermined time period after said disable signal is generated.

12. The system of claim 6, wherein said operational means includes:
a three phase operational control means to progressively increase the period of current conduction through said switching network from an initial time period to a greater time period per AC cycle, when transferring said energy to said three phase motor means; and
a single phase operational control means to progressively increase the period of current conduction through said switching network from an initial time period to a greater time period per AC cycle, when transferring said energy to said single phase motor means.

13. The system of claim 4 wherein said voltage switch means includes:
a three phase forward voltage switch means for connecting three phase AC voltage to the input of said power switching network in a forward phase direction; and
a single phase forward voltage switch means for connecting single phase AC voltage complementary with said forward phase direction, to the input of said power switching network.

14. The system of claim 13, wherein said voltage switch means further includes:
a three phase reverse voltage switch means for connecting 3 phase AC voltage to the input of said power switching network in a reverse phase direction with respect to said forward phase direction; and
a single phase reverse voltage switch means for connecting reverse single phase AC voltage complementary with said reverse phase direction, to the input of said power switching network.

15. The system of claim 1, wherein the "full" speed of the 3 phase motor means is substantially greater than the "full" speed of the single phase motor means.

16. The system of claim 1, wherein the direction of rotation of said single phase motor means is determined by the direction of rotation of said 3 phase motor means.

17. The system of claim 1, wherein said single phase motor means does not include a starting coil.

18. The system of claim 1, wherein said means for associating the three phase motor means with the output of the switching network includes:
a forward connecting means for connecting electrical energy in a forward direction to the three phase motor means; and
a reverse connecting means for connecting electrical energy in a reverse phase direction as compared to said forward phase direction, to said three phase motor means.

19. The system of claim 18 includes:
means to prevent current conduction through said switching network when connecting said forward or reverse connecting means.

20. The system of claim 19 includes:
means to prevent current conduction through said switching network when dis-connecting said forward or reverse connecting means.

21. The system of claim 1, wherein said three phase motor means and said single phase motor means have a common rotor.

22. The system of claim 1, includes:
means for accelerating the movement of said load when the three phase motor is associated with the system; and
means for decelerating the movement of said load when the single motor is associated with system.

23. The system of claim 22 wherein said means for decelerating the movement of said load includes:
means for switching from the three phase motor to the single phase motor when said load is moving due to the rotational force of the three phase motor.

24. The system of claim 18 includes:
means to prevent current conduction through said switching network when disconnecting said forward or reverse connecting means.

25. A method for moving a load between two points with a three phase alternating current (AC) motor providing a high speed and a single phase AC motor providing a low speed, including the steps of:
transferring electrical power to the three phase motor;
increasing the speed of the three phase motor toward said high speed to increase the speed of the load;

disconnecting the transfer of electrical power to the three phase motor;
transferring electrical power to the single phase motor; and
decreasing the speed of the load by increasing the torque of the single phase motor from an initial torque.

26. The method of claim 25, wherein the speed of the three phase motor is accelerated toward its high speed.

27. The method of claim 25, wherein the speed of the load is decelerated as the torque of the single phase motor is increased.

28. The method of claim 25 wherein the period of electrical power transfer to the three phase motor per AC voltage and current cycle is progressively increased from an initial period per cycle to a greater period per cycle, for progressively increasing the speed of the three phase motor.

29. The method of claim 25, wherein the period of electrical power transfer to the single phase motor per AC voltage and current cycle is progressively increased from an initial period per cycle to a greater period per cycle, for progressively increasing the torque of the single phase motor means.

30. The method of claim 25, wherein the period for AC voltage and current transfer to the three phase motor is progressively increased at a first rate of increase from an initial period per cycle to a greater period per cycle, and the period for AC voltage and current transfer to the three phase motor is progressively increased at a second rate of increase from said greater period to a maximum period per cycle until said three phase motor is near or at "full" speed, said second rate being greater than said first rate.

31. The method of claim 25, wherein the period per AC voltage and current transfer to the single phase motor per cycle is progressively increased at a first rate of increase from an initial period per cycle to a greater period per cycle, and the period per AC voltage and current cycle is progressively increased at a second rate of increase from said greater period to a maximum period per cycle until said single phase motor is near as a "full" speed.

32. The method of claim 29, wherein said transferring of electrical power to the three phase motor means and the single phase motor means includes:
connecting an AC source to an input to a power switching network;
connecting the three phase motor to the output of the power switching network;
progressively increasing the period of transfer of electrical power through the switching network to the three phase motor, after the AC source and the three phase motor are connected respectively at said input and said output, from an initial period per AC voltage and current cycle to a greater period per cycle and thereby progressively increasing the speed of the three phase motor from an initial speed to a greater speed;
disconnecting the three phase motor from the output of the switching network;
connecting the single phase motor to the output of the switching network; and
progressively increasing the period of transfer of electrical power through the switching network to the single phase motor means from an initial period per AC voltage and current cycle to a greater period per cycle and thereby progressively increasing the counter torque provided by the single phase motor from an initial torque to a greater torque.

33. A method for driving a load between a start point and a stop point with an alternating current (AC) motor means having a full speed comprising the steps of:
progressively increasing the period of electrical energy per AC cycle transferred in a first phase direction to the motor means from an initial period to a greater period per cycle, to cause the torque of the motor means to progressively increase and said speed to progressively increase toward said full speed; and
progressively increasing the period of electrical energy per AC cycle in an opposite phase direction with respect to said first phase direction, transferred to the motor means from an initial period to a greater period per cycle, to progressively increase the counter torque and thereby cause said motor means to slowly reach said stop point.

34. The method of claim 33, wherein said energy is transferred in said opposite direction after said load has passed said stop point, to cause said load to return to said stop point.

35. The method of claim 33 includes:
preventing energy transfer to said motor means prior to causing said energy transfer in said opposite direction.

36. The metnod of claim 33, wherein said energy is increased in said first direction to a motor means having a high full speed and the energy is increased in said reverse direction to said high speed motor means, and said method further comprises:
progressively increasing the period of electrical energy per AC cycle in said first direction to a motor means having a low full speed, prior to progressively increasing the energy per cycle in said opposite direction to said motor having said high full speed 37. The method of claim 36, wherein said full speed motor means is a single phase motor means.

* * * * *